United States Patent Office 3,285,850
Patented Nov. 15, 1966

3,285,850
SOLID FILM LUBRICANTS
John P. Graham, Bartlesville, Okla., assignor to Phillips Petroleum Company, a corporation of Delaware
No Drawing. Filed Feb. 13, 1964, Ser. No. 344,554
5 Claims. (Cl. 252—28)

This invention relates to a lubricating composition. In another aspect this invention relates to methods of lubrication and, more particularly, to those methods suitable at extreme environmental conditions and especially at temperatures high enough to cause charring or varnish and tar formation with the lubricating oil compositions used heretofore.

There are numerous devices utilizing moving parts containing bearings which are difficult to lubricate. Generally this is because of the presence of extreme environmental conditions such as very low temperatures, very high temperatures, or consecutive occurrences of both. For example, moving conveyor parts passing near of through paint-drying ovens such as those in automobile plants or near furnaces such as those in steel plants are difficult to lubricate since most conventional greases are either ineffective or unstable at these conditions. In recent years, even greater demands have been made of lubricants in that not only is stability over an extreme temperature range required, but stability at unusual pressures also is desired. For example, gimbal bearings on the exterior of space vehicles (such as those associated with navigational rocket nozzles) are subjected not only to extremes of heat and cold but to low pressures as well. In many of these situations, conventional lubricating oils and greases would be subject to freezing, burning, or boiling away.

I have now found that solid lubricating films can be prepared which not only are useful over a wide range of difficult environmental conditions but which offer impressive lubricating performance as well. These films are particularly useful in areas where relatively light bearing loads are encountered.

Accordingly, an object of this invention is to provide a solid film lubricant suitable for applications involving extreme environmental conditions.

Another object of the invention is to provide novel lubricating compositions suitable for use at extreme environmental conditions.

Another object of the invention is to provide a method for producing lubricated surfaces capable of withstanding extreme environmental conditions.

Other objects, advantages and features of the invention will be readily apparent to those skilled in the art from the following description and the appended claims.

In accordance with this invention I have now found that a lubricating composition formed by dispersing an arylene sulfide polymer in an alkali metal silicate is capable of being used under extreme environmental conditions. More specifically, an aqueous solution of an alkali metal silicate is prepared which contains from about 1 to 50 weight percent silicate. A poly(arylene sulfide) and other additives (if any) are then dispersed in this solution using any convenient mixing or blending technique. Solid additives should be in a fine state of subdivision such as about minus 200 mesh (U.S. sieve series) or finer.

After the film-forming silicate composition is prepared, it is applied to the bearing surface to be lubricated by any convenient means such as spraying, brushing, coating, or the like. The bearing surface and liquid coating are then dried and exposed to a high temperature cure for a period of time sufficient to expel the water and other easily volatilizable components and to form a tough, uniform film. This generally requires a period of a few minutes to several hours and can be carried out using an oven, radiant heating, contact with hot combustion gases, or similar means. Temperatures in the range of 300° to 1000° F. can be used. The resulting lubricating film offers lubricating protection to the bearing surfaces and is stable and effective at temperatures which may vary from about −100° to about 1000° F., depending on the application and the degree of exposure.

The composition of the solid lubricating film, after curing, can generally range from 1 to 40 weight percent and preferably 10 to 30 weight percent poly(arylene sulfide) based on the total amount of film with the remainder of the composition being an alkali metal silicate. In addition, from 0 to 20 weight percent but preferably from 0 to 15 weight percent, based on total weight of film, of other additives can be present in the composition.

The arylene sulfide polymers which are applicable for use in this invention are those prepared by reacting at least one polyhalo-substituted aromatic compound with an alkali metal sulfide. The reaction is preferably conducted at a temperature in the range of 125–450° C. in a reaction medium comprising a polar organic compound which is a solvent for the reactants and which is stable at the reaction conditions. N-methylpyrrolidone is a preferred reaction medium.

The polyhalo-substituted aromatic compounds which can be employed as primary reactants for the preparation of the arylene sulfide polymer are represented by the formulas:

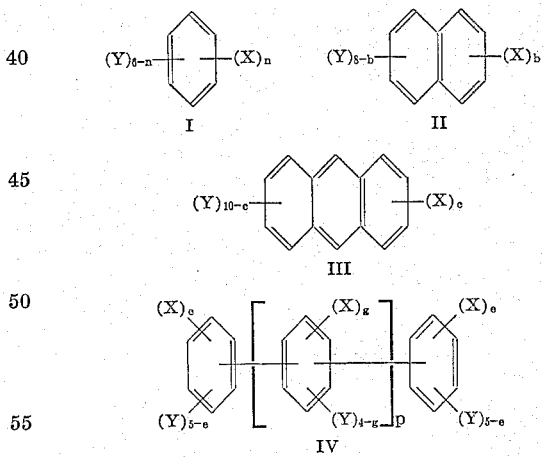

wherein each X is a halogen selected from the group consisting of chlorine, bromine, iodine and fluorine, preferably chlorine and bromine; each Y is selected from the group consisting of hydrogen, and alkyl, cycloalkyl, aryl radicals and combinations of these containing from 1 to 12 carbon atoms, inclusive; $n$ is an integer of 2 to 6, inclusive; $b$ is an integer of 2 to 8, inclusive; $c$ is an integer of 2 to 10 inclusive; $e$ is an integer of 1 to 5, inclusive;

$g$ is an integer of 0 to 4, inclusive; and $p$ is a whole integer selected from the group consisting of 0 and 1.

The compounds of the above general formulas which are preferred are those which contain not more than three halogen atoms and preferably are dihalosubstituted compounds. Some specific examples of the polyhalo-substituted compounds of the above general formulas which can be used in preparing the poly(arylene sulfide) component of the present invention are:

1,2-dichlorobenzene
2,5-dichlorotoluene
1,4-diiodobenzene
1,4-difluorobenzene
1,2,4,5-tetrabromobenzene
1-n-butyl-2,5-dichlorobenzene
1,4-dibromo-2,3,5,6-tetrafluorobenzene
4-chlorobromobenzene
1-cyclohexyl-2,5-diiodobenzene
1-n-dodecyl-2,5-dichlorobenzene
1,3,5-trichloro-2,4,6-triphenylbenzene
1,4-dichloro-7,8-diethylnaphthalene
1,4-dichloroanthracene
4,4'-dichlorobiphenyl
3,3',3''-trichloro-p-terphenyl
and the like.

The alkali metal sulfide reactants for the polymer formation are the monosulfides of sodium, potassium, lithium, rubidium, and cesium. The preferred sulfide reactant is sodium sulfide and its hydrates.

Polar organic solvents applicable as the medium in which the metal sulfide reacts with the polyhalo-substituted compound to form the polymer component of the inventive composition include the classes of amides, lactams, sulfones, and the like. Some examples are:

N-methyl-2-pyrrolidone
pyrrolidone
caprolactam
tetramethylurea
sulfolane
dimethylacetamide
low molecular weight polyamides,
and the like.

The alkali metal silicates applicable to the formation of the inventive lubricating film are those which are sufficiently water soluble to prepare film-forming liquids with relatively minor amounts of water. These include the various silicates of lithium, potassium, sodium, rubidium and cesium. Of these, the sodium and potassium silicates are the most available, sodium silicates being presently preferred. Soluble sodium silicates, also known as sodium metasilicates, comprise compounds in which the molar ratio of $Na_2O$ and $SiO_2$ varies to some extent and is generally from about 1:1 to about 1:4 and which contain various proportions of water. These are water-soluble solids which will form solid films upon drying of their aqueous solutions.

The invention is further illustrated by the following example, but it is not intended that the invention should be limited thereto.

*Example*

The inventive solid lubricating film was evaluated in a Timken Test such as that described in NLGI Spokesman, volume XX, No. 9, page 36, December 1956, except that the precoated cup was run against a dry block with no additional lubricant added, and only a five pound lever arm load was used.

The films were prepared using aqueous solutions of soluble sodium silicate and contained a phenylene sulfide polymer (prepared at a temperature of about 295° C. from the reaction of one mol of sodium sulfide and one mol of p-dichlorobenzene in an N-methylpyrrolidone medium) having a melting point of 280° C. Molybdenum disulfide was included in some formulations. The thickness of the solid film in each of the tests was comparable and was about 0.005 inch. The results of the Timken Wear and Timken Endurance tests using these films are seen in the following table:

| Lubricating Film | Timken Wear 5 Min., mm. | Timken Endurance at 5 Lb., minutes |
| --- | --- | --- |
| $Na_2SiO_3$ | 1.5 | 5 |
| $Na_2SiO_3$, 77 weight percent<br>PPS [1], 23 weight percent | 0.3 | 50 |
| $Na_2SiO_3$, 77 weight percent<br>$MoS_2$, 23 weight percent | 1.0 | 5 |
| $Na_2SiO_3$, 77 weight percent<br>PPS [1], 11.5 weight percent<br>$MoS_2$, 11.5 weight percent | 0.45 | 75 |

[1] Polyphenylene Sulfide.

Examination of the preceding table shows that the film prepared from sodium silicate and poly(phenylene sulfide) is more effective than sodium silicate films or sodium silicate films containing molybdenum disulfide. The combination of the organic sulfide and the molybdenum sulfide in sodium silicate, however, also provides an excellent lubricating film.

In addition, the data indicate that known solid lubricating agents such as molybdenum disulfide can be used to supplement poly(phenylene sulfide) in the sodium silicate lubricating films but cannot effectively replace it. Moreover, the Timken Endurance Test indicates that the poly(phenylene sulfide) and molybdenum disulfide combination gives unexpectedly good results in view of the results obtained when each was tested separately in the same sodium silicate matrix.

Various modifications of this invention can be made, or followed, in view of the foregoing, without departing from the spirit or scope thereof.

I claim:

1. A lubricating composition suitable for use under extreme environmental conditions which comprises a dispersion of a minor amount, sufficient to impart lubricity of arylene sulfide polymer in a major amount of alkali metal silicate.

2. A composition according to claim 1 wherein said arylene sulfide polymer is prepared by reacting an alkali metal sulfide with a polyhalo-substituted aromatic compound selected from the group consisting of compounds of the formulas:

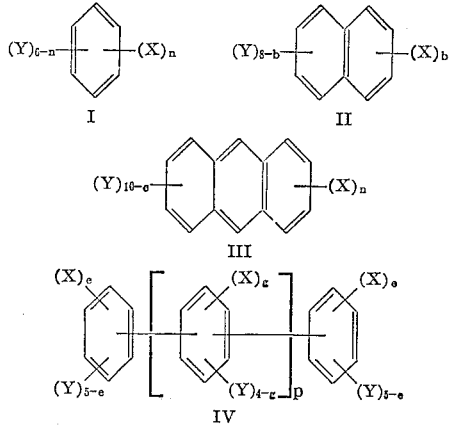

wherein each X is a halogen selected from the group consisting of clorine, bromine, iodine, and fluorine; each Y is selected from the group consisting of hydrogen, and alkyl, cycloalkyl, aryl radicals and combinations of these containing from 1 to 12 carbon atoms, inclusive; $n$ is an integer of 2 to 6, inclusive; $b$ is an integer of 2 to 8, inclusive; $c$ is an integer of 2 to 10, inclusive; $e$ is an integer of 1 to 5, inclusive; $g$ is an integer of 0 to 4, inclusive; and $p$ is a whole integer selected from the group consisting of 0 and 1.

3. A composition according to claim 2 wherein said alkali metal sulfide is selected from the group consisting of the monosulfide of sodium, potassium, lithium, rubidium and cesium, and wherein a polar solvent is employed at a temperature in the range of 125–450° F.

4. A composition suitable for use in the lubrication of a bearing surface consisting essentially of an alkali metal silicate having dispersed therein from 1 to 40 weight percent poly(phenylene sulfide).

5. A composition according to claim 4 containing up to 20 weight percent molybdenum disulfide and wherein said alkali metal silicate is sodium silicate.

References Cited by the Examiner

UNITED STATES PATENTS

| | | | |
|---|---|---|---|
| 2,790,833 | 4/1957 | Liao | 252—45 X |
| 2,979,457 | 4/1961 | Scherer et al. | 252—28 |
| 3,079,204 | 2/1963 | Lamson et al. | 252—28 X |
| 3,102,862 | 9/1963 | Green et al. | 252—28 |
| 3,206,467 | 9/1965 | Reifschneider | 252—45 X |

DANIEL E. WYMAN, *Primary Examiner.*

P. P. GARVIN, *Assistant Examiner.*

UNITED STATES PATENT OFFICE
CERTIFICATE OF CORRECTION

Patent No. 3,285,850                          November 15, 1966

John P. Graham

It is hereby certified that error appears in the above numbered patent requiring correction and that the said Letters Patent should read as corrected below.

Column 4, line 55, in formula III, for "$(X)_n$" read -- $(X)_c$ --.

Signed and sealed this 24th day of October 1967.

(SEAL)
Attest:

Edward M. Fletcher, Jr.                        EDWARD J. BRENNER
Attesting Officer                              Commissioner of Patents